United States Patent [19]

Ishii et al.

[11] 4,175,631

[45] Nov. 27, 1979

[54] HEAT ABSORPTION MEANS OPERATIVE AT PRESCRIBED TEMPERATURE FOR SUPPRESSION OF HEAT TRANSFER FROM ABNORMALLY HEATED AUTOMOTIVE EXHAUST SYSTEM TO ARTICLE ON BOARD

[75] Inventors: Kiminori Ishii; Katsuhiko Nishizawa, both of Yokohama, Japan

[73] Assignee: Nissan Motor Co., Ltd., Yokohama, Japan

[21] Appl. No.: 851,956

[22] Filed: Nov. 16, 1977

[30] Foreign Application Priority Data

Dec. 28, 1976 [JP] Japan ................................ 51-159425

[51] Int. Cl.² ........................ B60R 23/00; B60K 13/04
[52] U.S. Cl. ...................................... 180/309; 60/299; 296/1 F; 296/39 A; 428/920
[58] Field of Search ........... 180/64 A; 296/1 F, 39 A; 60/299, 320; 106/75; 428/920, 921; 252/455 R

[56] References Cited

U.S. PATENT DOCUMENTS

| | | | |
|---|---|---|---|
| 2,116,771 | 5/1938 | Seaman | 296/39 A |
| 2,978,340 | 4/1961 | Veatch et al. | 106/75 |
| 3,756,839 | 9/1973 | Rao | 106/75 |
| 3,963,087 | 6/1976 | Grosseau | 180/64 A |
| 3,988,161 | 10/1976 | Kaneko et al. | 106/75 |
| 3,991,254 | 11/1976 | Takeuchi | 428/920 |

*Primary Examiner*—David M. Mitchell
*Attorney, Agent, or Firm*—Schwartz, Jeffery, Schwaab, Mack, Blumenthal & Koch

[57] ABSTRACT

In an automobile having an exhaust gas purifying device such as a catalytic converter beneath the floor of the vehicle body, a heat absorption layer is provided, within a space bounded on its lower and upper sides by the purifying device and an interior covering for the floor to prevent the covering from being burned in case of an abnormal rise in the temperature of the purifying device. The essential material of the heat absorption layer is a hydrate which loses its water of hydration at a temperature to which is heated the heat absorption layer in case of the abnormality.

5 Claims, 3 Drawing Figures

HEAT ABSORPTION MEANS OPERATIVE AT PRESCRIBED TEMPERATURE FOR SUPPRESSION OF HEAT TRANSFER FROM ABNORMALLY HEATED AUTOMOTIVE EXHAUST SYSTEM TO ARTICLE ON BOARD

BACKGROUND OF THE INVENTION

This invention is concerned with an automobile provided with a catalytic converter in the exhaust line and relates to a precautionary measure against burning of an interior covering for the vehicle floor by an abnormal rise in the temperature of the catalytic converter.

Catalytic converters are widely used in automotive engine exhaust systems for the removal of carbon monoxide and hydrocarbons, and sometimes nitrogen oxides too, from the exhaust gas. Since exothermic oxidation reactions occur in a catalytic converter for this purpose, there occurs a significant rise in the temperature of the catalytic converter if a larger quantity of unburned fuel is introduced into the converter as the result of a certain trouble such as run-on of the engine, misfires in the engine or a failure of an acceleration pedal return mechanism. Since the catalytic converter is almost unexceptionally located beneath the floor of the vehicle body at a short distance, such an extraordinary temperature rise of the converter causes a significant heating of the floor in a region above the converter. Then there is a possibility, not merely suppositionally, that an interior covering for the floor such as a carpet which has a relatively low ignition point might be burned. The possibility of such accident is seen also when a thermal reactor or afterburner is employed in place of a catalytic converter, though the possibility is rather remote in this case.

To prevent this sort of accident, it has already been put into practice to provide a warning system which monitors the temperature of the catalytic converter and/or the floor to give a visual or auditory warning to the driver if occurs an abnormal temperature rise so that the driver may take a certain counter-measure. Furthermore, it is prevailing to provide a heat-shield plate above or around the catalytic converter so as to shield the vehicle floor from the heat the converter radiates.

SUMMARY OF THE INVENTION

Concerning an automobile having as a component of its exhaust system an exhaust gas purifying device such as a catalytic converter, in which occurs exothermic oxidation of unburned fuel, located beneath the floor of the vehicle body, it is an object of the present invention to provide a highly effective method of preventing a combustible article laid on the upper side of the floor from being so extraordinarily heated as to arouse a fear of the article being burned by an abnormal rise in the temperature of the exhaust gas purifying device.

It is another object of the invention to provide an automobile which has an exhaust gas purifying device of the above described function and is characterized by the provision of a highly effective heat-absorbing means for preventing the described sort of article on board from being so extraordinarily heated as described above by an abnormal rise in the temperature of the exhaust gas purifying device.

According to the invention, a heat absorption layer particularly operative at a prescribed temperature within the range of about 100°–1200° C., usually about 100°—900° C., is provided on the upper or lower surface of an automobile body floor in a region above an exhaust gas purifying device such as a catalytic converter, or within a space between the floor and the purifying device, or on the outer surface of the purifying device, using a substance which can absorb a large amount of heat at a temperature which is specific to the substance and agrees with said prescribed temperature as the principal material of the heat absorption layer.

A substance which comprises water of hydration and loses it at a temperature specified above is useful in this invention as a heat-absorbing material. An example is a mixture of aluminum hydroxide and water glass (sodium silicate).

A relatively low temperature is prescribed to the heat absorption layer (meaning the use of a substance which loses water of hydration at a relatively low temperature) when the layer is laid on the upper surface of the vehicle floor, and a higher temperature is prescribed as the position of the layer is made closer to the exhaust gas purifying device.

When the temperature of the purifying device rises abnormally and the heat absorption layer is heated to the prescribed temperature, the heat-absorbing material loses its water of hydration and as a consequence absorbs a large amount of heat with a lowering in the rate of the temperature rise of the heat absorption layer. Due to this phenomenon, an article located above the heat absorption layer, for example a carpet on the floor, can be prevented from a rapid and dangerous temperature rise.

DESCRIPTION OF PREFERRED EMBODIMENTS

Table 1 presents examples of heat-absorbing materials useful in the present invention.

Table 1

| Material | Temperature at which occurs removal of water of hydration (°C., approx.) | Heat absorption ability (cal/g, approx.) |
|---|---|---|
| Mixture of Aluminum hydroxide and Water glass | 100–200 | 470 |
| Hydrated gypsum | 160 | 165 |
| Copper sulfate | 200–260 | |
| Zinc sulfate | 280 | |
| Zinc borate | 330 | 150 |
| Borox | 350–400 | 90 |
| Calcium hydroxide | 450 | 220 |

Table 1-continued

| Material | Temperature at which occurs removal of water of hydration (°C., approx.) | Heat absorption ability (cal/g, approx.) |
| --- | --- | --- |
| Kaolin | 500 | 135 |
| Alumstone | 650 | |
| Calcium carbonate | 880–900 | 430 |

The primary basis for the selection of a heat-absorbing material is an intended position of the heat absorption layer relative to the catalytic converter. A material which loses its water of hydration at a relatively high temperature must be employed when the intended position is relatively close to the catalytic converter. It is preferable that the operative temperature of the heat absorption layer is about 100°–150° C. in the case the providing the layer on the upper side of the vehicle floor but is about 1000°–1200° C. on the surface of, or in the vicinity of, the catalytic converter.

It is a practically convenient method of forming a heat-absorption layer according to the invention to coat a surface of a vehicle floor in a region above a catalytic converter with a slurry or paste containing a material which absorbs heat upon removal of water of hydration. To coat the upper surface of the floor is usually preferable in view of ease in the coating work and durability of the coated layer. In this case the use of a heat-absorbing material which loses its water of hydration at a temperature of about 150° C. is preferable. In this respect, a mixture of aluminum hydroxide and water glass is a quite suitable heat-absorbing material since this material loses its hydrate water at temperatures between 100° and 200° C. (depending on the mixing ratio) and readily gives a paste by the addition of water.

Figure 1:
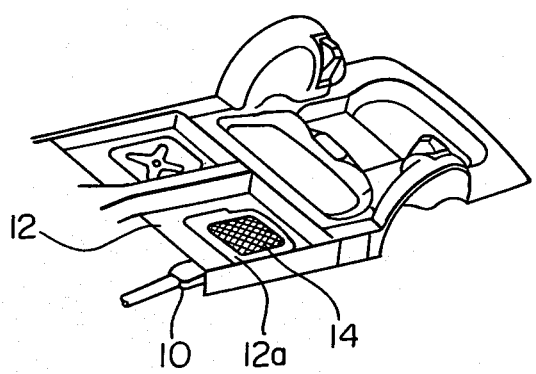
FIG. 1 is a perspective view of a lower part of an automotive body with a catalytic converter held beneath the body floor, showing as an embodiment of the invention the provision of a heat-absorption layer on the upper surface of the floor in a region above the catalytic converter.

In FIG. 1, a catalytic converter 10 is arranged stationarily beneath a floor 12 of an automotive body with a certain distance therebetween. The upper surface of the floor 12 is laid with a heat-absorption layer 14 in a region 12a located above the catalytic converter 10. The heat-absorption layer 14 is illustrated as is formed by the application of a paste or slurry directly onto the upper surface of the floor 12, followed by drying. There is no need of providing any extra element such as brackets to support the heat-absorption layer 14. In plan view, the heat-absorption layer 14 or the coated region 12a of the floor 12 is wide enough to contain therein the catalytic converter 10 entirely. When a covering such as a carpet (not shown) is laid on the floor 12, the heat-absorption layer 14 in its entirety is interposed between the carpet and the floor 12.

The floor 12 in the region 12a will be heated significantly if there occurs an extraordinary rise in the temperature of the catalytic converter 10 due to a certain trouble such as an abnormal combustion in the engine. This causes a rise in the temperature of the heat-absorption layer 14, particularly a lower part thereof. When the layer 14 is even partly heated to a prescribed temperature (a temperature specific to the chosen heat-absorbing material), the heat-absorbing material in the layer 14 begins to lose its water of hydration with absorption of a considerable amount of heat. In the case of using a 50/50 (by weight) mixture of aluminum hydroxide and water glass as the material of the heat-absorption layer 14, the liberation of the water of hydration begins at about 150° C. and the amount of heat absorbed into the layer 14 is about 470 cal/g. In addition to such an extent of heat absorption, the liberated water takes up a considerable amount of heat, 539 cal/g, as the heat of vaporization. Thus, the presence of the heat-absorption layer 14 offers significant obstruction to the heat transfer from the heated region 12a of the floor 12 to the carpet, so that a rise in the temperature of the carpet occurs only to a very small extent relative to the temperature rise of the floor 12 in the region 12a. Consequently the carpet is hardly heated to a temperature at which it begins to burn.

Figure 2:
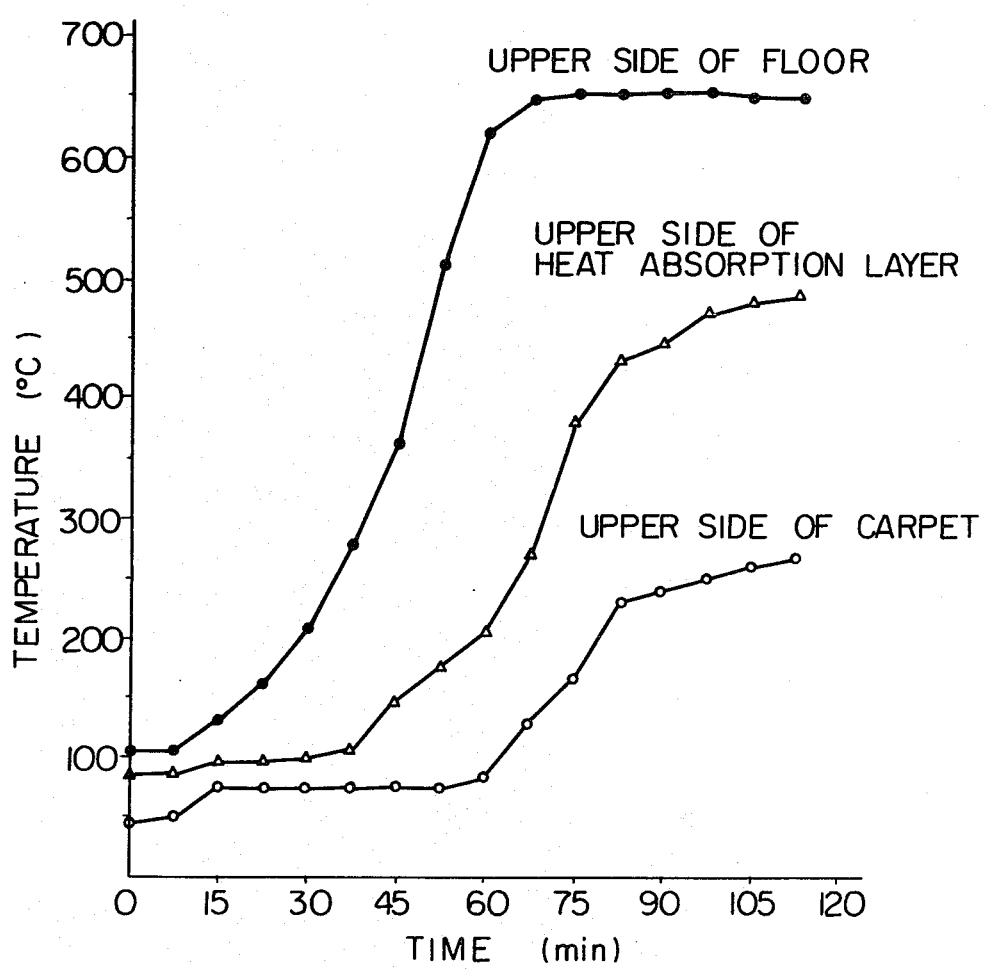
FIG. 2 is a graph showing an experimentally confirmed heat-absorbing ability of the heat-absorption layer in FIG. 1.

We have conducted an experiment to examine the heat-absorbing ability of the above described heat-absorption layer 14 of FIG. 1, formed by the application of a 50/50 (by weight) mixture of aluminum hydroxide and water glass to a thickness ranging from 7 to 15 mm. A carpet was laid on the floor 12 so as to cover the heat-absorption layer 14 entirely, and the floor 12 was heated from the lower side by the use of a heater positioned beneath the coated region 12a in place of the catalytic converter 10. For any thickness of the heat-absorption layer 14 within the 7–15 mm range, the carpet exhibited only a very slow temperature rise for a period of tens of minutes after the floor temperature reached 100° C. FIG. 2 shows the result of this experiment for the case of the heat-absorption layer 14 being 10 mm thick. The figures on the abscissa imply amounts of time elapsed from the moment the temperature of the upper surface of the floor 12 in the region 12a reached 100° C. The temperatures of the floor 12 in the region 12a, the heat-absorption layer 14 and the carpet were measured on their upper surfaces. As seen in FIG. 2, the temperature of the floor 12 reached about 600° C. after the lapse of 60 min but the temperature of the carpet at this moment remained at about 80° C., a temperature far lower than the ignition point (about 250° C.) of the carpet. The experimental result demonstrates that there is practically no chance of the carpet being burned even though the catalytic converter is heated extraordinarily within the bounds of possibility.

Figure 3:
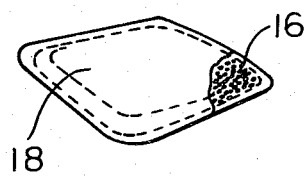
FIG. 3 is a partly cutaway perspective view of a flat bag stuffed with a heat-absorbing material as another embodiment of a heat-absorption layer according to the invention.

FIG. 3 shows a different way of laying a heat-absorbing material, for example the above described mixture of aluminum hydroxide and water glass, on the upper side of the floor 12. The material indicated at 16 in FIG. 3 is packed in a bag 18 made of a heat-conductive and uncombustible sheet material such as aluminum foil, and the edges of the bag 18 are entirely seam-welded. The packed bag 18 is relatively flat and may be regarded as a pad. This heat-absorption pad is placed on the upper surface of the floor 12 in the region 12a in place of the coated layer 14 in FIG. 1. It is possible to replace the bag 18 by a rigid container of a heat-conductive and uncombustible material. This method does not differ in effect from the method illustrated in FIG. 1.

A heat-absorption layer according to the invention may be formed either on the lower surface of the floor 12 or on the outside of the catalytic converter 10 instead of, or in addition to, its provision on the upper surface of the floor 12. Also it is possible to provide a heat-absorption layer at a location between the catalytic converter 10 and the lower surface of the floor 12. In this case, a shelf or brackets are attached to the vehicle body so as to lie beneath the floor 12 at a suitable distance, and a heat-absorbing material is coated on the shelf or alternatively is packed in a heat-conductive container which is held by the brackets. As mentioned hereinbefore, it is necessary to use a heat-absorbing material which loses its water of hydration at relatively high temperatures in the case of providing a heat-absorption layer at a location relatively close to the catalytic converter 10.

What is claimed is:

1. In an automobile having a body including a floor and as a component of an exhaust system an exhaust gas purifying device, in which occurs exothermic oxidation of unburned fuel, located beneath the floor, the improvement comprising a heat absorption layer which is particularly operative at a prescribed temeperature within the range from about 100° C. to about 1200° C. and located within a space bounded on its upper and lower sides by a horizontal plane slightly above the upper surface of the floor and the outer and upper surface of the purifying device, respectively, a principal material of said heat absorption layer being a substance which absorbs a large amount of heat at a temperature which is specific to said substance and agrees with said prescribed temperature, said heat absorption layer consisting of a container made of a heat-conductive and uncombustible metal foil material and said substance packed in said container.

2. An automobile as claimed in claim 1, wherein said exhaust gas purifying device is a catalytic converter.

3. An automobile as claimed in claim 1, wherein said prescribed temperature ranges from about 100 to about 900° C., said substance comprising water of hydration at temperatures below said prescribed temperature.

4. An automobile as claimed in claim 3, wherein said substance is a mixture of aluminum hydroxide and water glass.

5. An automobile as claimed in claim 3, wherein said substance is selected from the group consisting of hydrated gypsum, copper sulfate, zinc sulfate, zinc borate, borox, calcium hydroxide, kaolin, alumstone and calcium carbonate.

* * * * *